US011034293B2

(12) United States Patent
Darnaud et al.

(10) Patent No.: US 11,034,293 B2
(45) Date of Patent: Jun. 15, 2021

(54) SYSTEM FOR GENERATING WARNINGS FOR ROAD USERS

(71) Applicant: TRANSDEV GROUP, Issy les Moulineaux (FR)

(72) Inventors: Thomas Darnaud, Versailles (FR); Cem Karaoguz, Palaiseau (FR); William Levassor, Rueil Malmaison (FR); Louis Baudet, Versailles (FR)

(73) Assignee: TRANSDEV GROUP INNOVATION, Issy les Moulineaux (FR)

( * ) Notice: Subject to any disclaimer, the term of this patent is extended or adjusted under 35 U.S.C. 154(b) by 0 days.

(21) Appl. No.: 16/582,936

(22) Filed: Sep. 25, 2019

(65) Prior Publication Data

US 2020/0094735 A1 Mar. 26, 2020

(30) Foreign Application Priority Data

Sep. 25, 2018 (FR) ..................................... 18 58722

(51) Int. Cl.
 *B60Q 1/52* (2006.01)
 *B60Q 5/00* (2006.01)
 (Continued)

(52) U.S. Cl.
 CPC ............. *B60Q 1/525* (2013.01); *B60Q 5/006* (2013.01); *B60W 40/04* (2013.01); *G08G 1/166* (2013.01); *B60W 2554/00* (2020.02)

(58) Field of Classification Search
 CPC ... B60Q 1/525; B60Q 5/006; B60W 2554/00; B60W 40/04; G08G 1/005; G08G 1/0112; G08G 1/0141; G08G 1/162; G08G 1/166
 See application file for complete search history.

(56) References Cited

U.S. PATENT DOCUMENTS

2004/0022416 A1\* 2/2004 Lemelson .............. G08G 1/165
 382/104
2011/0199199 A1\* 8/2011 Perkins .................. B60Q 9/008
 340/435

(Continued)

FOREIGN PATENT DOCUMENTS

EP 1 550 586 A1 2/2018
FR 2 887 669 A3 12/2006

OTHER PUBLICATIONS

Preliminary Search Report received in French Patent Application No. 1858722 dated Jun. 6, 2019.

*Primary Examiner* — Sisay Yacob
(74) *Attorney, Agent, or Firm* — Knobbe, Martens, Olson & Bear, LLP

(57) ABSTRACT

A system and a method automatically generate warnings intended for users of a road on board an automobile. The system includes sensors, an on-board programmable electronic device, and at least one audible or visual warning device. The programmable electronic device includes at least one processor configured to detect traffic elements, and a module for analyzing traffic elements, such that each detected traffic element is associated with a predetermined category and an associated confidence level is calculated. A module determines an at-risk situation from among a number of predetermined risk situations. At least one of the traffic elements is associated with at least one user of the road outside said vehicle. A command module warns the user of the road of the detected risk.

10 Claims, 2 Drawing Sheets

(51) Int. Cl.
  *B60W 40/04*  (2006.01)
  *G08G 1/16*  (2006.01)

(56) References Cited

U.S. PATENT DOCUMENTS

2017/0222612 A1* 8/2017 Zollner .................. G08G 1/167
2017/0358203 A1* 12/2017 MacNeille ............. G08G 1/005
2018/0050635 A1   2/2018 Vincent et al.
2018/0068190 A1* 3/2018 Son .................... B60W 60/0015
2018/0173971 A1* 6/2018 Jia ........................ G06K 9/6288

* cited by examiner

SYSTEM FOR GENERATING WARNINGS FOR ROAD USERS

CROSS-REFERENCE TO RELATED APPLICATION

This application claims priority to French Patent Application No. 18 58722 filed on Sep. 25, 2018, the disclosure of which including the specification, the drawings, and the claims is hereby incorporated by reference in its entirety.

FIELD OF THE INVENTION

The present invention relates to a system for automatically generating warnings intended for users of a road, on board an automobile, and an associated method and computer program.

BACKGROUND OF THE INVENTION

The invention falls within the field of the secure driving of automobiles, in particular in the field of road safety. It is in particular applicable in the field of autonomous or semi-autonomous automobiles.

In the field of the secure driving of automobiles, and in particular in autonomous driving, one of the main issues is the early identification of obstacles on the path of a moving vehicle, making it possible to take corrective measures so that the vehicle does not strike these obstacles.

Driver assistance systems exist, called ADAS (Advanced Driver Assistance Systems), as well as obstacle identification and avoidance systems for autonomous vehicles. Such systems make it possible to identify traffic elements present in an environment of a moving vehicle, owing to sensors and on-board computing systems, and to determine which traffic elements may constitute potential obstacles on the path of this vehicle.

The traffic elements in question are stationary or moving, and may or may not be associated with other users of the road, for example drivers of other vehicles or pedestrians. The stationary traffic elements are for example safety rails, sidewalks, signage panels or parked vehicles. It will be understood that it is critical to avoid any collision between a moving vehicle and such obstacles.

The known automobile driver assistance systems are suitable for issuing warnings if the presence of an obstacle is detected, which may lead to a system creating a risk of incident or accident, that may or may not involve another user of the road. For example, an audio and/or visual warning is issued, intended for the driver of a vehicle equipped with an ADAS system.

At-risk situations generally involve several users of the road, for example several vehicles in the case of a collision risk, and the current systems are suitable for warning the driver of a vehicle, who in turn can actuate warning mechanisms (for example horn or lights) to warn other users of the road of an imminent risk. The autonomous vehicles are equipped with systems provided to prevent collisions between these vehicles and other vehicles.

It is desirable to increase road safety for all users of the road.

SUMMARY OF THE INVENTION

To that end, the invention proposes a system for automatically generating warnings intended for users of a road, on board a motor vehicle including on-board sensors, an on-board programmable electronic device, and equipped with at least one warning device, either audible or visual, said sensors being suitable for providing information to the programmable electronic device, said programmable electronic device including at least one processor suitable for implementing at least one algorithm for detecting traffic elements located in a zone surrounding said vehicle. The processor is configured for implementing a module for analyzing traffic elements detected during a time interval, making it possible to associate each detected traffic element with a predetermined category, and calculating an associated confidence level, and a module for determining an at-risk situation, from among a plurality of predetermined risk situations, involving detected traffic elements, based on the result of the analysis module and the calculated confidence level, at least one of said traffic elements being associated with at least one user of the road outside said vehicle. The system is suitable for implementing at least one of said on-board warning devices, to warn said at least one user of the road of the detected risk.

Advantageously, the invention makes it possible to generate warnings intended for users of the road outside the automobile carrying the proposed system, whether the vehicle is autonomous or semi-autonomous, following the determination of at-risk situations that may involve traffic elements outside the vehicle.

Advantageously, the calculation of a confidence level makes it possible to avoid an untimely warning generation.

The system for automatically generating warnings according to the invention may also have one or more of the features below, considered independently or according to all technically conceivable combinations.

For each moving traffic element, the confidence level is also associated with at least one parameter characterizing the movement of said traffic element.

The warning devices comprise at least one display screen placed so as to be visible from outside the vehicle, and/or at least one audible warning device.

The implementation of said warning devices is done contextually with respect to the determined at-risk situation.

The system suitable for determining a position of said at least one external user of the road and selecting at least one of said warning devices to be actuated based on said position.

According to another aspect, the invention relates to a method for automatically generating warnings intended for users of a road, on board a motor vehicle including on-board sensors, an on-board programmable electronic device, and equipped with at least one warning device, either audible or visual, said sensors being suitable for providing information to the programmable electronic device, said programmable electronic device including at least one processor suitable for implementing at least one algorithm for detecting traffic elements located in a zone surrounding said vehicle. This method is implemented by said processor and includes the following steps:
  analyzing traffic elements detected during a time interval, making it possible to associate each detected traffic element with a predetermined category, and calculating an associated confidence level,
  determining an at-risk situation, from among a plurality of predetermined risk situations, involving detected traffic elements, based on the result of the analysis step and the calculated confidence level, at least one of said traffic elements being associated with at least one user of the road outside said vehicle, implementing at least one of said on-board warning devices, to warn said at least one user of the road of the detected risk.

The method for automatically generating warnings according to the invention may also have one or more of the features below, considered independently or according to all technically conceivable combinations.

The analysis step implements a classification algorithm based on neural networks.

The confidence level is determined based on performance criteria of the classification algorithm based on neural networks, comprising a precision level and a recall level.

The implementation of one of the warning devices comprises a selection of a device to be actuated based on a spatial position of at least one traffic element involved in said determined at-risk situation, and an actuating command of the selected warning device(s) with a warning message generated contextually with respect to the determined at-risk situation.

According to another aspect, the invention relates to an information recording medium, on which software instructions are recorded for carrying out a method for automatically generating warnings as briefly described above, when these instructions are executed by a programmable electronic device.

According to another aspect, the invention also relates to a computer program including software instructions which, when executed by a programmable electronic device, implement such a method for automatically generating warnings as briefly described above.

BRIEF DESCRIPTION OF THE DRAWINGS

Other features and advantages of the invention will emerge from the description thereof provided below, for information and non-limitingly, in reference to the appended figures, in which.

DETAILED DESCRIPTION OF EMBODIMENTS

Figure 1:
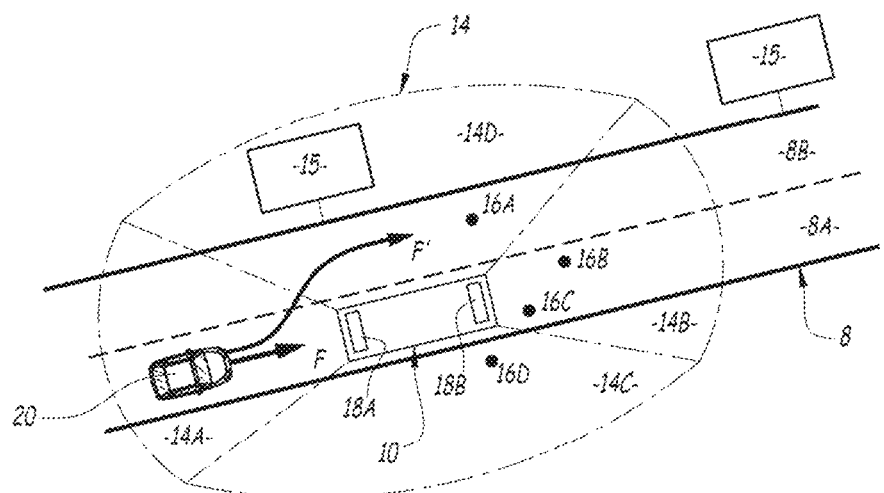
FIG. 1 is a schematic illustration of an automobile equipped with a system for automatically generating warnings according to one embodiment, in a usage scenario.

FIG. 1 schematically illustrates a usage case of an electronic device for identifying obstacles on the path of an automobile 10.

The automobile 10 is for example an autonomous automobile having a level of automation greater than or equal to 3 on the scale of the Organisation Internationale des Constructeurs Automobiles [International Organization of Motor Vehicle Manufacturers] (OICA). For example, it is a transport vehicle of the four wheel type, or a bus or coach bus.

In a variant, the motor vehicle 10 is a conventional vehicle, driven by a driver, but equipped with a driver assistance system, in particular including sensors and/or receivers for data coming from external sensors.

The vehicle 10 illustrated in the example of FIG. 1 travels on a road 8, in the example including two traffic lanes 8A and 8B.

Figure 2:
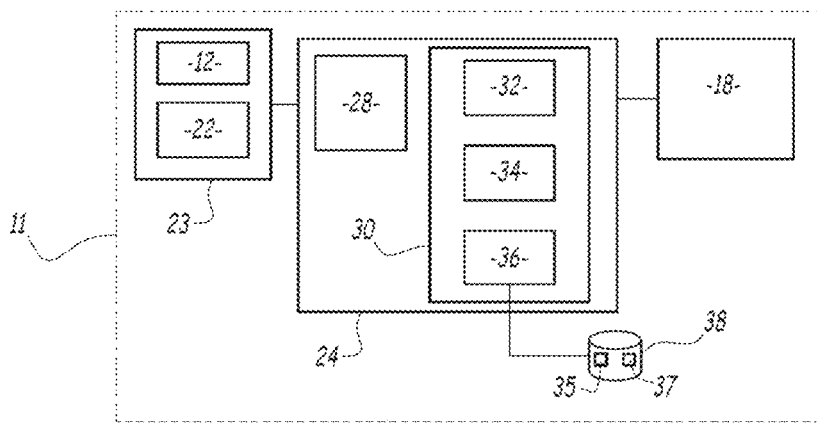
FIG. 2 is a block diagram of the main elements of an on-board system for automatically generating warnings according to one embodiment.

FIG. 2 schematically illustrates a system for automatically generating warnings 11 carried by an automobile 10 according to one embodiment.

Such a vehicle 10 is equipped with a plurality of sensors 12, for example of the lidar type with scanning and/or cameras, suitable for detecting objects present in a surrounding area 14 of the vehicle 10. Of course, a same vehicle 10 can be equipped with a plurality of sensors 12, each sensor having an associated detection area.

The surrounding area 14 comprises, in one embodiment, several subareas respectively located in front or, behind or on the sides of the vehicle 10 depending on the positioning of the sensors 12 on the vehicle.

For example, in FIG. 1, four subareas, respectively referenced 14A, 14B, 14C and 14D form the surrounding area 14.

Of course, the surrounding area 14 moves at the same time as the vehicle.

Owing to the sensors 12, it is possible to detect the presence of traffic elements in the environment 14 of the vehicle 10, at a given moment in time or in a given time interval. It is also possible to detect whether the traffic elements are stationary or in motion, and to obtain characteristic parameters of the detected traffic elements (e.g., movement speed, movement direction).

Here, a traffic element refers to any element present in a perimeter including the considered roads 8.

A traffic element is either stationary or in motion. Any traffic element can constitute an obstacle and be involved in an at-risk situation.

A stationary traffic element is for example a signage panel, a signal light, a speed bump positioned across the road, an element at the edge of the road (sidewalk, safety rail).

A moving traffic element is for example another vehicle traveling on the road (car, motorcycle, bicycle, bus, etc.) or a pedestrian. Certain traffic elements are associated with users of the road, who are for example drivers, passengers or pedestrians.

In the scenario of FIG. 1, the vehicle 10 is for example an autonomous passenger transport vehicle, for example a bus, that is temporarily stopped.

Another vehicle 20 arrives behind the vehicle 10, moving with a non-nil speed in the direction of the arrow F. The second vehicle 20 is for example a vehicle with a driver on board.

One possible scenario is that the vehicle 20 follows the path referenced F' to pass the vehicle 10. Furthermore, in the exemplary scenario of FIG. 1, in addition to the vehicle 20, traffic elements 16A, 16B, 16C and 16D are detected by the sensors 12 of the system carried by the vehicle 10. For example, they are pedestrians having left the vehicle 10.

The vehicle 10 being bulky, it hides the visibility of the vehicle 20, in particular the pedestrians 16B and 16C.

If the vehicle 20 follows the path F', there is a high risk of collision with one of the pedestrians 16B or 16C.

The automatic warning generating system makes it possible to identify this at-risk situation and to generate a warning intended for the driver of the vehicle 20 and/or intended for the pedestrians 16B and 16C, who are users of the road affected by the detected at-risk situation.

For example, warning devices 18A, 18B are used to that end.

In one embodiment, the warning devices are display screens, for example light-emitting diode screens, or flexible screens. In practice, it is possible to provide any number of displays of display screens, for example behind, in front of and next to the vehicle 10.

In a variant and/or additionally, audible warning devices are used, for example making it possible to generate a sound specific to the type or risk level, or a warning spoken by a voice synthesis system. For example, the audible warning devices are microphones, speakers, or sound warnings (horn, gong, bell).

In one embodiment, aside from the on-board sensors 12, stationary road edge sensors 15 are also present, each sensor 15 also having an associated detection area for traffic elements. Each sensor 15 is equipped with a wireless communication module (not shown), for example a radio module, and is suitable for sending position information of traffic elements detected using this communication module.

The automatic warning generating system 11 also includes at least one wireless communication module 22, suitable for receiving position information of traffic elements detected by stationary road edge sensors.

The on-board sensor(s) 12 and/or the wireless communication module 22 suitable for receiving position information of traffic elements detected by external sensors form a unit 23 for obtaining information making it possible to detect traffic elements located near the vehicle 10.

The automatic warning generating system further comprises a programmable electronic device 24, suitable for commanding the warning devices 18.

The programmable electronic device 24 is suitable for receiving information coming from sensors via the unit 23, for example by means of a wired connection.

The programmable electronic device 24 is for example an on-board computer, comprising a processor 28 associated with a memory unit 30.

It is suitable for implementing:
a module 32 for analyzing detected traffic elements, making it possible to associate each detected traffic element with a predetermined category, and calculating an associated confidence level,
a module 34 for determining an at-risk situation, from among a plurality of predetermined risk situations, involving detected traffic elements, based on the calculated confidence level, and
a module 36 for commanding the warning devices based on the determined at-risk situation.

The automatic warning generating system further includes a storage memory 38, which can, in one embodiment, be integrated into the memory 30, suitable for storing data and parameters, for example a database 35 of parameters making it possible to classify the traffic elements into predetermined categories, and a database 37 making it possible to identify at-risk situations.

Advantageously, the command of the warning devices is contextual, therefore based on the determined at-risk situation.

For example, in the scenario of FIG. 1, a specific display intended for the vehicle 20 is done on the display screen 18A located behind the vehicle 10. For example, a sound warning is commanded in front of the vehicle, intended for identified pedestrians 16B and 16C.

In one embodiment, the modules 32, 34 and 36 are each made in the form of software, or add-on software, executable by the processor 28.

The memory 30 of the programmable electronic device 24 is then able to store automatic warning generating software configured to implement an automatic warning generating method. The processor 28 is then able to execute this software.

In a variant that is not shown, the modules 32, 34 and 36 are each made in the form of a programmable logic component, such as an FPGA (Field Programmable Gate Array), a GPU (Graphic Processing Unit), or a GPGPU (General-Purpose Processing on Graphics Processing), or in the form of a dedicated integrated circuit, such as an ASIC (Application Specific Integrated Circuit).

The automatic warning generating software is further suitable for being recorded, in the form of a computer program including software instructions, on a computer-readable medium, not shown. The computer-readable medium is for example a medium suitable for storing electronic instructions and able to be coupled with a bus of a computer system. As an example, the readable medium is an optical disc, a magnetic-optical disc, a ROM memory, a RAM memory, any type of non-volatile memory (for example, EPROM, EEPROM, FLASH, NVRAM), a magnetic card or an optical card.

Figure 3:
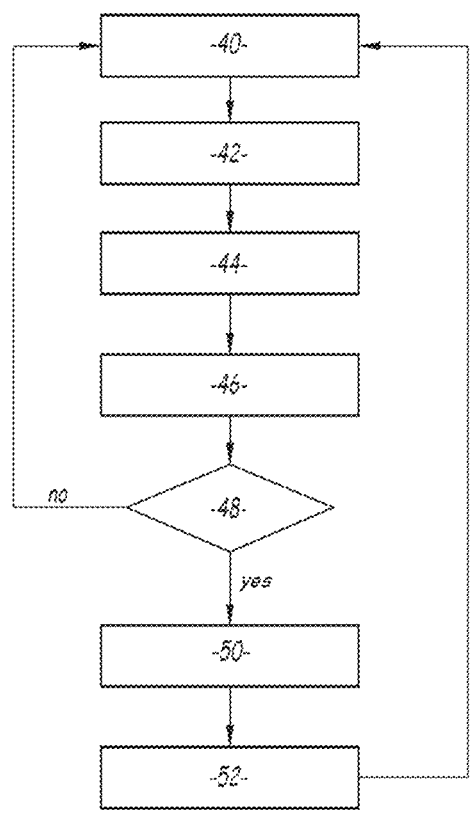
FIG. 3 is a flowchart of the steps of a method for automatically generating warnings according to one embodiment of the invention.

FIG. 3 is a flowchart of the main steps of a display method according to one embodiment.

The method includes a first step 40 for receiving data from sensors, coming from the unit 23 for obtaining information making it possible to detect traffic elements present in an area surrounding the vehicle carrying the system, whether the carrier vehicle is in motion or stopped.

In one embodiment, the sensors are of the lidar type, and the data from the sensors comprise position data detected by at least one traffic element point at a given moment. For example, a sequence of position data read at successive moments in time in an analysis time interval are received.

In a variant or additionally, the on-board sensors comprise one or several cameras, and in this case the data from sensors comprise digital images, each image being captured at a given moment in time, or a video comprising a series of images, optionally encoded according to an appropriate encoding format, over an analysis time interval.

The method next comprises a step 42 for detecting traffic elements in the surrounding zone, for example making it possible to detect their position relative to the vehicle, in a chosen spatial coordinate system, and/or their path, and/or their movement speed or any other characteristic parameter of the movement of a moving traffic element. Step 42 is for example implemented by known obstacle detection algorithms, for example radar detections (Doppler effect used in the radars and/or lidar), or in the field of ADAS such as "collision warning" or "emergency braking".

Step 42 is followed by a step 44 for analysis and classification of the detected traffic elements, as well as awarding a confidence level associated with the obtained result. The classification includes at least two categories, which are the stationary traffic elements and the moving traffic elements. For example, an analysis of the data received over the analysis time interval makes it possible to identify stationary or moving traffic elements, and, if applicable, to estimate a movement speed and a movement direction of each detected traffic element.

For example, a tracking algorithm makes it possible to determine the path of a moving traffic element and to predict, with an associated confidence level, a sequence of expected positions of the moving traffic element at future moments in time.

In the case where digital images are available, it is possible to perform an image analysis and to more finely detect the membership of each traffic element in a category from among predetermined categories, for example comprising the type of stationary element (signal light, pedestrian passage, speed bump), automobile, bicycle or pedestrian.

A confidence level, for example a number between 0 and 1, is associated with the classification of each detected traffic element, where 0 indicates the lowest confidence level and 1 indicates the highest confidence level relative to the detection and the classification of the traffic element.

The confidence level associated with the detection applies not only to the classification of the detected traffic elements, but also to the associated parameters (speed, path), which next make it possible to determine a collision risk, and more generally whether the traffic element may be involved in an at-risk situation.

For example, a neural network-based algorithm is used to calculate such a confidence level, for example by using neural network functions proposed in the Keras library (see the website https://keras.io/).

Such an algorithm makes it possible to analyze the data from sensors, for example the images, and to compare them to data previously recorded and labeled, which represent what is called "the ground truth". The confidence level can be calculated as a function of a prior evaluation of the precision of the chosen algorithm. The evaluation is done on test data, in a known manner, based on performance criteria, namely the precision and the recall.

The analyzed traffic elements for which the calculated confidence level is greater than or equal to a predetermined confidence threshold are sent to step 46 for determining the at-risk situation.

For example, the confidence threshold is chosen based on precision and recall criteria, preferably by setting a very high precision level and a medium recall level.

In one embodiment, the confidence level is set by feedback following a test phase.

Step 46 implements an at-risk situation determination involving several traffic elements, which may or may not involve the vehicle carrying the system.

The at-risk situations are for example inventoried and stored beforehand, for example based on the presence of pedestrians and/or stationary traffic elements of a certain type requiring the carrier vehicle to slow down.

An at-risk situation is a situation that may cause an incident or an accident, for example a frontal or side collision, between traffic elements, or the presence of obstacles (e.g., speed bumps) that may damage a vehicle, or traffic conditions identified as unusual, for example the presence of a construction signal light. Of course, the above list is not exhaustive, and other at-risk situations may be considered.

The determination of an at-risk situation takes account of the movement parameters of detected moving traffic elements (speed, detected and predicted path of the traffic element), the categories associated with the detected traffic elements. Furthermore, the traffic elements potentially involved in an at-risk situation are identified. In particular, the movement parameters of the detected traffic elements make it possible to implement a collision forecast.

If an at-risk situation is determined (verification in the verification step of presence of at-risk situation 48), in particular of the type involving at least one other user of the road associated with a traffic element involved in the at-risk situation, for example a pedestrian or a driver/passenger of another traveling vehicle, the method comprises a selection step.

The method next comprises a step 50 for determining and selecting one or several warning devices to be actuated, based on the determined at-risk situation. It involves a contextual display selection. For example, if several types of on-board warning devices are present, in step 50 a determination is made of which display device to use, for example sound and/or display screen.

In particular, the situational analysis provides spatial position information of the traffic elements involved in the at-risk situation, and associated users of the road. Advantageously, the selection of a warning device accounts for the spatial position of outside users to be warned, the warning device being chosen such that the warning is easily and quickly understood by this user. For example, when several display screens are available, the screen located so as to be visible by the involved user of the road is chosen. For example, in the scenario of FIG. 1, the display screen behind the vehicle 10 is chosen to display information intended for the driver of the vehicle 20.

Furthermore, a warning message is determined contextually based on the determined at-risk situation: text message, or drawing/danger indicator, sound or text-type warning to be voiced by a synthesis method.

Lastly, in step 52, the method commands the actuation of the chosen warning device(s) with the warning message generated in step 50. The command of the actuation of the warning device can also be configured based on the type of determined at-risk situation or the determined risk level. For example, in the case of a visual display, a blinking message can be displayed in case of high risk level. Any other format or display mode making it possible to indicate the risk level, easy to understand by an outside user of the road, can be chosen. It is also possible to combine several warning devices, for example visual and sound, to indicate a high accident risk situation.

The method returns to the data obtainment step 40 previously described.

In case of negative verification in step 48 for the presence of an at-risk situation, step 48 is also followed by step 40, without actuating warning devices.

Advantageously, the method according to the invention makes it possible to increase road safety by implementing devices on board an autonomous or semi-autonomous vehicle in order to determine at-risk situations involving users of the road outside the carrier vehicle, and to warn them accordingly.

The invention claimed is:

1. A system for automatically generating warnings intended for users of a road, on board a motor vehicle including on-board sensors, an on-board programmable electronic device, and equipped with at least one warning device, either audible or visual, said sensors being suitable for providing information to the programmable electronic device, said programmable electronic device including at least one processor suitable for implementing at least one algorithm for detecting traffic elements located in a zone surrounding said vehicle, wherein the processor is configured for implementing:

a module for analyzing detected traffic elements during a time interval, making it possible to associate each detected traffic element with a category from among a plurality of predetermined categories, and calculating an associated confidence level, a module for determining an at-risk situation, from among a plurality of predetermined risky situations, involving detected traffic elements, based on the result of the analysis module and the calculated confidence level, at least one of said traffic elements being associated with at least one user of the road outside said vehicle, and wherein the system is suitable for implementing at least one of said on-board warning devices to warn said at least one user of the road of the detected risk.

2. The system according to claim 1, wherein for each moving traffic element, said confidence level is also associated with at least one parameter characterizing the movement of said traffic element.

3. The system according to claim 1, wherein said warning devices comprise at least one display screen placed so as to be visible from outside the vehicle, and/or at least one audible warning device.

4. The system according to claim 2, wherein implementation of said warning devices is done contextually with respect to the determined at-risk situation.

5. The system according to claim 4, suitable for determining a position of said at least one external user of the road and selecting at least one of said warning devices to be actuated based on said position.

6. A method for automatically generating warnings intended for users of a road, on board a motor vehicle including on-board sensors, an on-board programmable electronic device, and equipped with at least one warning device, either audible or visual, said sensors being suitable for providing information to the programmable electronic device, said programmable electronic device including at least one processor suitable for implementing at least one algorithm for detecting traffic elements located in a zone surrounding said vehicle, said method being implemented by said processor and being comprising the following steps:

analyzing traffic elements detected during a time interval, making it possible to associate each detected traffic element with a category from among a plurality of predetermined categories, and calculating an associated confidence level, determining an at-risk situation, from among a plurality of predetermined risky situations, involving detected traffic elements, based on the result of the analysis step and the calculated confidence level, at least one of said traffic elements being associated with at least one user of the road outside said vehicle, implementing at least one of said on-board warning devices, to warn said at least one user of the road of the detected risk.

7. The method according to claim 6, wherein the analysis step implements a classification algorithm based on neural networks.

8. The method according to claim 7, wherein the confidence level is determined based on performance criteria of the classification algorithm based on neural networks, comprising a precision level and a recall level.

9. The method according to claim 6, wherein the implementation of one of the warning devices comprises a selection of a device to be actuated based on a spatial position of at least one traffic element involved in said determined at-risk situation, and an actuating command of the selected warning device(s) with a warning message generated contextually with respect to the determined at-risk situation.

10. A computer program including software instructions which, when executed by a computer, carry out an automatic warning generating method according to claim 6.

* * * * *